United States Patent [19]

Hirukawa et al.

[11] Patent Number: 4,903,662
[45] Date of Patent: Feb. 27, 1990

[54] SPARK TIMING CONTROLLER FOR SPARK IGNITED INTERNAL COMBUSTION ENGINE

[75] Inventors: Itsushi Hirukawa; Kazuya Takeuchi; Nobuki Motoshige, all of Hamamatsu, Japan

[73] Assignee: Sanshin Kogyo Kabushiki Kaishi, Shiauoka, Japan

[21] Appl. No.: 247,748

[22] Filed: Sep. 21, 1988

[30] Foreign Application Priority Data

Sep. 24, 1987 [JP] Japan .............................. 62-239192

[51] Int. Cl.⁴ .............................................. F02P 5/15
[52] U.S. Cl. ..................................... 123/418; 123/334
[58] Field of Search ................ 123/334, 335, 418, 339

[56] References Cited

U.S. PATENT DOCUMENTS

| | | | |
|---|---|---|---|
| 4,336,778 | 6/1982 | Howard | 123/334 |
| 4,359,983 | 11/1982 | Carlson et al. | 123/339 |
| 4,385,601 | 5/1983 | Orova et al. | 123/334 |
| 4,403,970 | 9/1983 | Dretzka et al. | 123/335 |
| 4,492,197 | 1/1985 | Yamamoto et al. | 123/334 |
| 4,570,595 | 2/1986 | Andreasson | 123/335 |
| 4,572,150 | 2/1986 | Foster | 123/335 |
| 4,712,527 | 12/1987 | Staerzl | 123/418 |
| 4,790,279 | 12/1988 | Tobinaga et al. | 123/418 |

*Primary Examiner*—Raymond A. Nelli
*Attorney, Agent, or Firm*—Ernest A. Beutler

[57] ABSTRACT

Several embodiments of spark timing control for spark ignited internal combustion engines that improve running under certain adverse conditions. Arrangements are disclosed for reducing the speed of the engine in response to certain abnormal conditions, such as shifting of an associated transmission. The speed is reduced by interrupting the spark of the engine. In accordance with the disclosed embodiments, uneven running and stalling is avoided by advancing the spark if the engine speed falls below a predetermined engine speed.

10 Claims, 8 Drawing Sheets

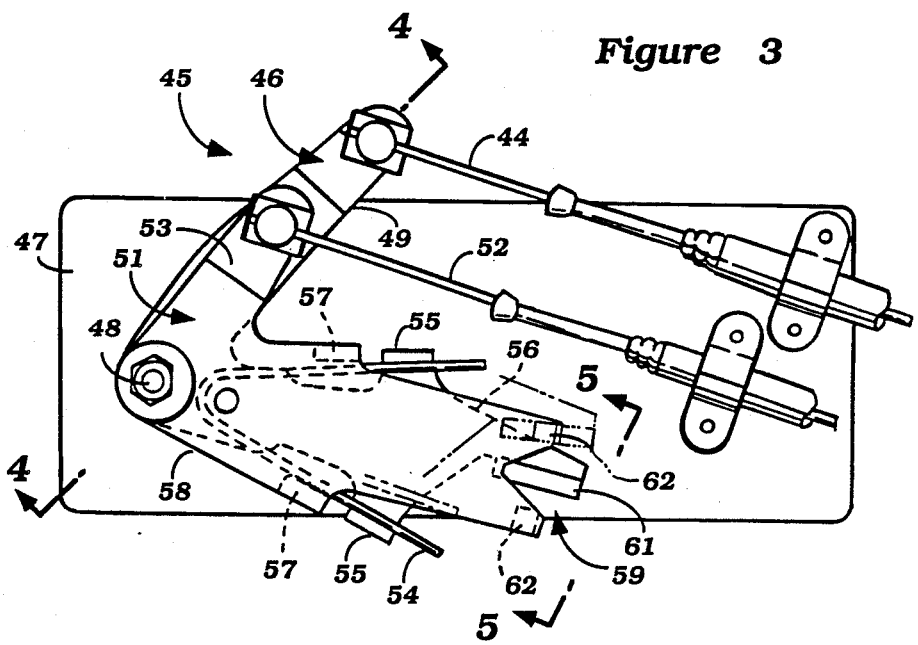
Figure 3
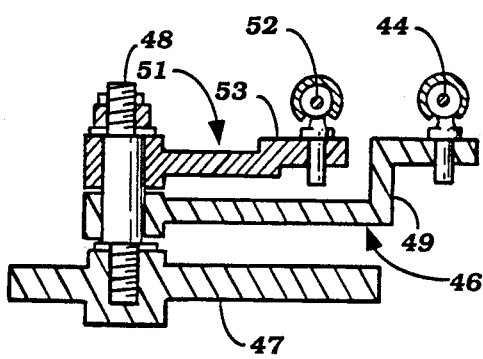
Figure 5
Figure 4

SPARK TIMING CONTROLLER FOR SPARK IGNITED INTERNAL COMBUSTION ENGINE

BACKGROUND OF THE INVENTION

This invention relates to a spark timing controller for spark ignited internal combustion engines and more particularly to a spark timing controller that will ensure against stalling of the engine or erratic running under certain conditions.

As is generally known, the spark advance curve for an internal combustion engine follows a generally predictable pattern. That is, during cranking, idling and at low speeds the spark is provided with a fixed spark advance that is close to top dead center position. In some instances, this spark advance may be either before or after top dead center. Then as the engine speed increases, the spark advance is increased either along a straight or curved line until a maximum spark advance is reached. This maximum spark advance may occur before the maximum speed of the engine and the engine operates beyond this speed with a fixed spark advance. Of course, this type of spark advance curve is only a general description and specific engines vary within the general parameters set forth.

There are certain running conditions, however, wherein the conventional spark advance curve of the engine is not appropriate to the specific running characteristic. For example, it is the common practice with engines to employ some arrangement for reducing the speed of the engine under certain abnormal or senced conditions. For example, under conditions of emergency deceleration or upon abrupt interruption or reduction of engine speed for such reasons as engine protection in view of an abnormal running condition or to slow the speed of the engine to assist in shifting, the fixed spark advance curve may provide poor running. In addition, these conditions can, in extreme cases, cause stalling of the engine.

In the copending application of Kazumasa Ito entitled "Control Means of Internal Combustion Engine for Marine Propulsion", Ser. No. 229,942 filed Aug. 8, 1988 and assigned to the assignee of this invention, there is disclosed a spark advance system wherein poor running conditions and/or stalling are precluded by shifting the spark advance to a difference spark advance curve, normally an advanced curve, under such conditions. Although the systems disclosed in that application are particularly advantageous, they do require complicated circuitry and logic for their operation.

It is, therefore, a principal object of this invention to provide an improved spark timing control for a spark ignited internal combustion engine.

It is a further object of this invention to provide a spark timing control for a spark ignited internal combustion engine that is simple in construction, operation and principal and yet will prevent rough running or stalling under sudden deceleration conditions.

It is a still further object of this invention to provide an improved system for advancing the spark of an engine under extreme deceleration without necessitating complicated control logic.

SUMMARY OF THE INVENTION

This invention is adapted to be embodied in a spark ignited internal combustion engine that has means for firing its spark plug at a spark timing in accordance with a first, established spark advance curve. Means are provided for firing the spark at a point advanced from the first spark advance curve in response to the speed of the engine falling below a predetermined speed.

BRIEF DESCRIPTION OF THE DRAWINGS

FIG. 3 is an enlarged side elevational view showing the shifting detector of this embodiment.

FIG. 4 is a cross sectional view taken along the line 4—4 of FIG. 3.

FIG. 5 is a view looking in the direction of the line 5—5 in FIG. 4.

DETAILED DESCRIPTION OF THE PREFERRED EMBODIMENTS OF THE INVENTION

Before referring generally to the illustrated embodiments, a brief description of the principle upon which the invention operates is believed to be in order. As has been previously noted, most spark ignited internal combustion engines have a fixed spark advance curve that is effective to provide a first relatively minor spark advance under cranking and idling conditions, then a gradually increasing spark advance up until a maximum spark advance at some speed less than wide open throttle and maximum speed. This maximum spark advance is then held through out the remainder of the engine speed. In connection with a number of applications, a control arrangement may be provided for the engine which will have the effect of reducing the engine speed under certain conditions. As will be discussed in conjunction with the two specific physical embodiments of the invention, one condition under which this may happen is in a marine outboard drive that includes a dog clutching transmission. In connection with such transmissions, it is the practice frequently to use a shift sensor to sense when a shift is being made and the engine speed is automatically reduced so as to assist in the shifting. However, when the engine speed is so reduced, there is a likelihood of poor running because the fixed spark advance curve does not suit this particular condition. In accordance with the invention, therefore, an arrangement is provided for sensing when this abnormal condition, such as shifting, occurs and also when the engine speed falls below a predetermined, relatively low engine speed. At this time, the spark is advanced so as to ensure against stalling of the engine and to improve running.

Figure 1:
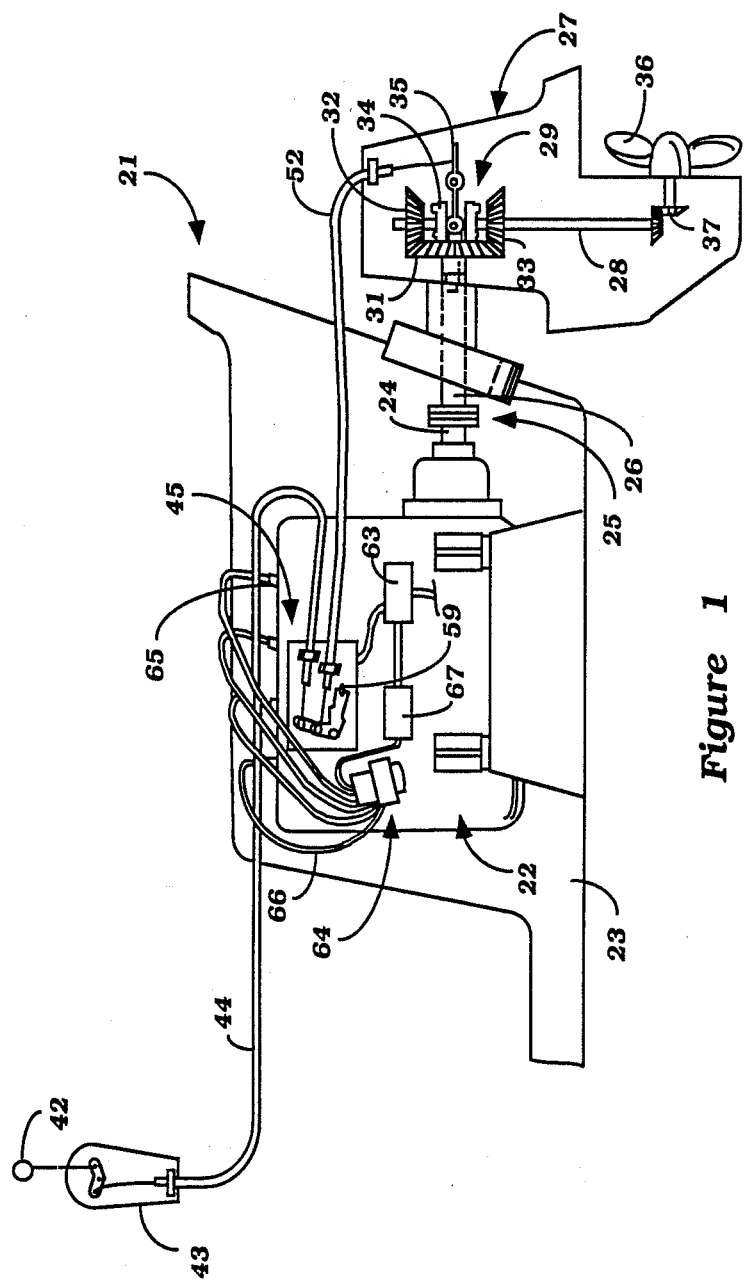
FIG. 1 is a side elevational view, with portions broken away and other portions shown in section, of a marine outboard drive constructed in accordance with a first embodiment of the invention.
Figure 2:
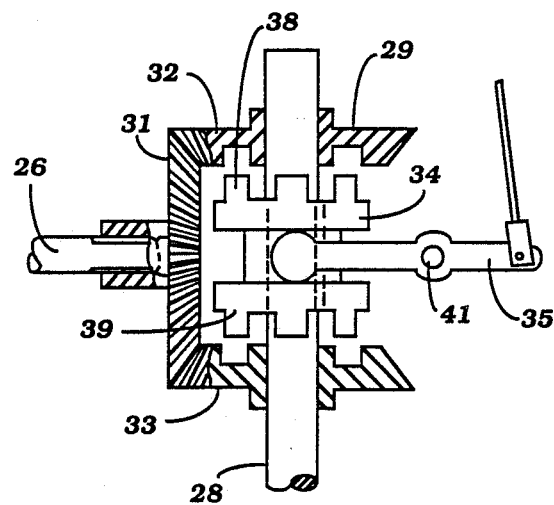
FIG. 2 is an enlarged cross sectional view showing the transmission and shifting mechanism of this embodiment.

Referring now specifically to FIGS. 1 through 5, they show a first embodiment of the invention and environment wherein such a spark advance control is particularly useful. Referring now to these figures and initially primarily to FIG. 1, a watercraft is indicated generally by the reference numeral 21 and includes an inboard outboard drive arrangement that is comprised of a spark ignited internal combustion engine 22 that is mounted within the hull 23 of the watercraft. The engine 22 has an output shaft 24 that is coupled by a flexible coupling 25 to an input shaft 26 of an outboard drive unit, indicated generally by the reference numeral 27. The input shaft 26 drives a driveshaft 28 by means of a conventional bevel gear type forward, neutral, reverse transmission, indicated generally by the reference numeral 29. This type of transmission includes an input driving gear 31 that meshes with a pair of diametrically opposed driven bevel gears 32 and 33 (FIG. 2). Because of their diametric engagement with the driving bevel gear 31, the driven bevel gears 32 and 33 will rotate in opposite directions.

The driven bevel gears 32 and 33 are journaled upon the driveshaft 28 and a dog clutching element 34 is between these gears. The dog clutching element 34 is splined to the propeller shaft 28 and is axially movable along it. The dog clutching sleeve 34 is operated by a bellcrank 35 so as to selectively engage either the gear 32 or the gear 33 with the driveshaft 28 for driving it in selected forward or reverse direction. This drive is transmitted to a propeller 36 by means of a bevel gear train 37.

It should be noted that the forward, neutral, reverse transmission 29 is shown in more detail in FIG. 2. As may be seen in this figure, the dog clutching sleeve 34 has oppositely facing dog clutching teeth 38 and 39 that are adapted to engage corresponding teeth in the gears 32 and 33, respectively, so as to transmit drive there between. In addition, the pivotal support 41 for the bellcrank 35 appears more clearly in this figure.

The dog clutching sleeve 34 is operated by means of a remotely positioned shift lever 42 (FIG. 1) that is mounted on a control bracket 43 in proximity to the operator's seat of the watercraft 21. The shift lever 42 is connected by means of a boat bowden wire mechanism 44 to a combined shift detector and motion transmitter 45. The shift detector and motion transmitter 45 is shown in most detail in FIGS. 5 through 7 and reference will now be made to those figures.

The shift detecting mechanism 45 is comprised of a first bellcrank, indicated generally by the reference numeral 46 and which is pivotally journaled on a mounting plate 47 by means of a pivot pin 48. The mounting plate 47 may be conveniently mounted to the engine 22 in any suitable manner. The bowden wire 44 is connected to an arm 49 of the bellcrank 46 for pivoting the bellcrank 46 upon actuation of the operator controlled shift lever 42.

A second bellcrank, indicated generally by the reference numeral 51, is also pivotally supported by the pivot pin 48 and, hence, pivots about the same axis as the bellcrank 46. One end of a flexible transmitter 52 is connected at one end to one arm 53 of the bellcrank 51 to effect movement of the bellcrank 35 and dog clutching sleeve 34 upon pivotal movement of the bellcrank 51. The other end of the flexible transmitter 52 is connected to the bellcrank 35.

A resiliently biased lost motion connection is provided between the bellcranks 46 and 51. This connection is provided by means of a hair pin shaped spring 54 that has its legs loaded between a first pair of lugs 55 formed on the other leg 56 of the bellcrank 46 and a second pair of lugs 57 formed on the other leg 58 of the ballcrank 51. The spring 54 normally has sufficient rigidity so as to effect simultaneous pivotal movement of the bellcranks 46 and 51 upon operator actuation of the shift lever 42 for operating the bellcrank 35 and shifting the transmission 29. However, if there is substantial resistance to the engagement or disengagement of the dog clutching teeth 38 or 39 with the corresponding teeth of one of the driven bevel gears 32 or 33, the spring 54 will yield and permit some relative rotation between the bellcranks 46 and 51 until the dog clutching teeth can move into or out of engagement.

A detector, indicated generally by the reference numeral 59, is provided for sensing when relative movement occurs between the bellcranks 46 and 51 and, accordingly, when there is a resistance to shifting. The detector 59 includes a detecting device 61 that is mounted on the arm 56 of the bellcrank 46. The arm 58 of the bellcrank 51 is bifurcated and carries a pair of small permanent magnets 62. When relative movement occurs between the bellcranks 46 and 51, the detector 61 will move into proximity with one of the permanent magnets 62 as shown in the phantom line in FIGS. 3 and 5. At this time, the detector 61, which turns "on" and, will emit a signal to indicate that there is resistance to shifting. This signal is transmitted to a shift assist mechanism, indicated generally by the reference numeral 63 (FIG. 1), for reducing the torque of the engine so as to assist in shifting.

Referring again to FIG. 1, the shift assisting mechanism 63 operates on the ignition system of the engine so as to reduce engine speed and, accordingly, engine torque so as to assist in shifting. The ignition system for the engine includes a distributor 64 which may be of any known type and fires the sparkplugs 65 of the engine through suitable spark plug leads 66. The distributor 64 includes a spark advance mechanism, indicated generally by the reference numeral 67 and which serves to advance the timing of the firing of the spark plugs 65 along a fixed spark advance curve dependent upon the speed of the engine. As will become more apparent as this description proceeds, the spark timing mechanism 67 also includes a spark advance device for advancing the spark under certain running conditions so as to avoid rough running or stalling of the engine.

The shift assisting mechanism 63 includes an arrangement which effects misfiring of the spark plug 65 under the condition when the shift detector 59 indicates a resistance to shifting and also when the engine speed is over a predetermined speed, such as 2000 rpm when shift assisting is required by reducing engine torque. The mechanism for misfiring the spark plus in order to reduce engine speed may be of any of the known types.

In conjunction with the reduction of engine torque by reducing engine speed through the misfiring of the spark plugs, there is a danger that the misfiring may reduce the speed of the engine sufficiently so as to cause uneven running or even stalling. In addition, the mere misfiring of the spark plug itself can give rise to certain disadvantages and unsatisfactory performance. In accordance with the invention, the engine 22 and specifically the spark timing control mechanism 67 incorporates a system for preventing such adverse running conditions.

Figure 6:
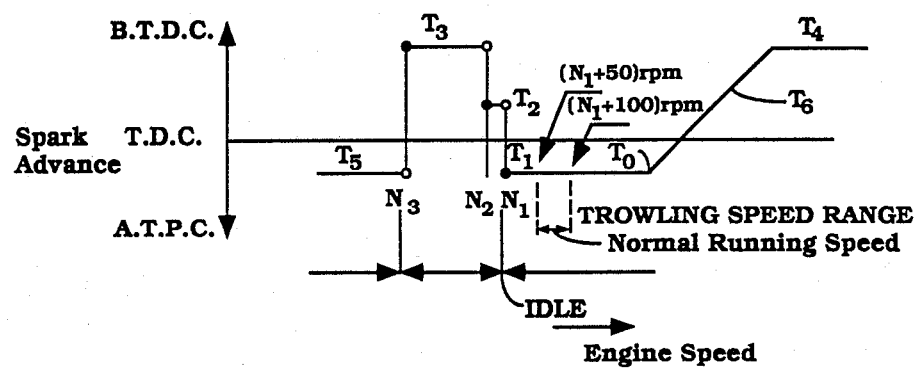
FIG. 6 is a spark timing curve showing first embodiment of how the spark timing may vary in response to certain parameters in order to achieve good running and prevent stalling. Spark advance is shown in the ordinate and the engine speed is shown on the abscissa.

This system and the method by which it operates may be best understood by reference to FIG. 6, which is a spark advance engine speed timing graph showing an embodiment of the invention. It should be noted that the spark timing curve includes a normal fixed timing curve which covers the area from normal idle speed to maximum engine speed. This timing includes a fixed spark advance from a speed slightly above idle speed to a speed below the normal trolling speed of the watercraft. This speed range may be approximately from 600 rpm up to approximately 1000 or 1200 rpms. The spark advance then follows an advance curve shown by the portion of the curve $T_6$ until a fixed spark advance $T_4$ at some speed less than wide open speed. The spark advance is then held fixed through the remainder of the running of the engine. As aforedescribed, however, it is to be understood that the actual spark advance curve may differ slightly depending upon actual engine desired characteristics.

With normal engine spark control, the spark advance curve at idle is also held at speeds below idle including down to cranking speeds which are speeds $N_3$ and below. This normal spark advance at cranking is indicated by the line $T_s$. In accordance with the invention, however, when the engine speed is being reduced to prevent misfiring and the engine speed actually falls below the speed $N_1$, the mechanism provides a spark advance to the point $T_3$, which is something less than maximum spark advance so as to increase the engine running speed. The fixed advance is held until the engine speed reaches a speed $N_2$, which is something still less than idle speed and then the spark advance is reduced in a step to the point $T_2$ speed is reached. The normal spark advance curve is then followed during the remainder of engine running.

Figure 7:
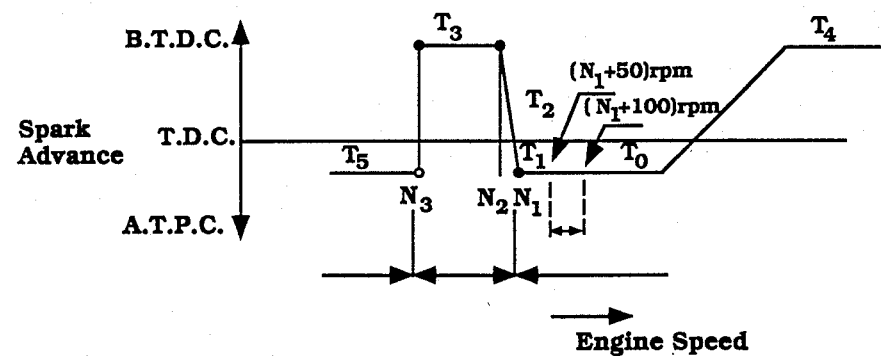
FIG. 7 is a graphical view showing the spark advance curve in accordance with another embodiment of the invention.

It is to be understood that the spark may be advanced only in a single fixed step to the spark $T_3$ or, alternatively, the spark may be gradually retarded from the point $T_3$ to the point $T_1$ as shown in FIG. 7.

Figure 8:
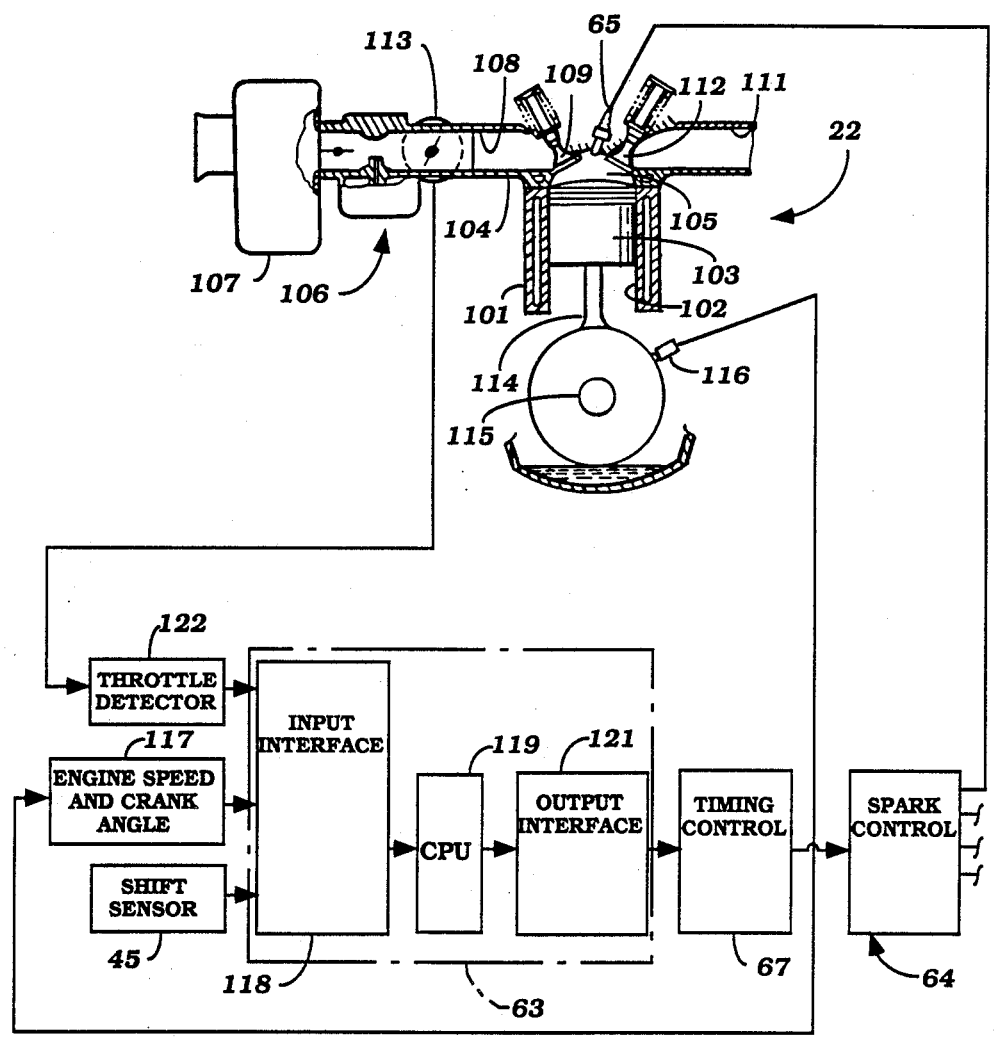
FIG. 8 is partially schematic partial cross section view of an internal combustion engine constructed in accordance with another embodiment of the invention.

In the embodiments of the invention as thus far described the device has operated so as to prevent rough engine running or stalling in the event that the spark plugs of the engine have been misfired due to the sensing of an abnormal condition such as shifting of the engine. The aforenoted poor running characteristics can also arise in the event the throttle valve of the engine is abruptly closed in response to some form of emergency conditions. It has been found that these deleterious effects can also be avoided by advancing the ignition timing and FIG. 8 illustrates an embodiment of the invention that incorporates a system for advancing the spark and preventing poor running under each of these conditions. In this figure, certain components of the construction are the same as the previously described embodiment and where that is the case these components have been identified by the same reference numerals and will be described again in detail only in so far is necessary to understand the construction and operation of this embodiment.

In FIG. 8 wherein the engine 22 is depicted in partial cross-section, the engine 22 includes a cylinder block 101 having a cylinder bore 102 in which a piston 103 reciprocates. A cylinder head 109 is affixed to the cylinder block 101 and defines a combustion chamber 105 with the cylinder bore 102 and piston 103. In this embodiment of the invention, the engine 22 is of the spark ignited, four cycle type and the spark plug 65 is supported within the cylinder head 104 and has its gap disposed in the combustion chamber 105 for firing a charge at the appropriate time interval as set by the distribution 64 and spark timing control 67.

A carburetor 106 draws air through an air inlet device 107 and is provided for delivering a fuel/air charge to the combustion chamber 105 through an intake passage 108. An intake valve 109 controls the communication of the intake passage 108 with the combustion chamber 105 in a known manner. There is also provided an exhaust passage 111 through which the exhaust gases are discharged to the atmosphere and an exhaust valve 112 controls the communication of the combustion chamber 105 with the exhaust passage 111 in a known manner. The carburetor 106 has a throttle valve 113 for controlling the flow of fuel/air mixture to the intake passage 108 in a known manner.

The piston 113 is connected by means of a connecting rod 114 to a chrankshaft 115 for driving the crankshaft 115 in a known manner. A pulser coil 116 cooperates with the crankshaft 115 for generating a pulse at the appropriate time which pulse is delivered to a circuit shown schematically at 117 which provides an output signal indicative of engine speed as well as crankshaft angle. The circuit 117 outputs a signal to an input interface 118 that conveys the information to a micro computer 119. The micro computer 119 outputs information to the timing control device 67 through an output interface 121 for firing the spark plug 65.

A throttle valve closing detector 122 is also provided that outputs a signal through the input interface 118 to CPU 119. The throttle detector 121 may be of any known type and provides an input signal in the event the throttle valve 113 is rapidly closed. The CPU 119 operates in accordance with a routine to be described so that if a shift condition is being sensed the engine speed will be reduced by misfiring as aforedescribed. In addition, if the engine speed falls below the speed at which running will be improved by advancing the spark as also described previously. In addition, the CPU 119 is programmed so as to detect rapid closing of the throttle valve 113 through the input from the throttle valve detector 122 and will advance the spark in the same procedure in order to avoid rough running and stalling.

Figure 9:
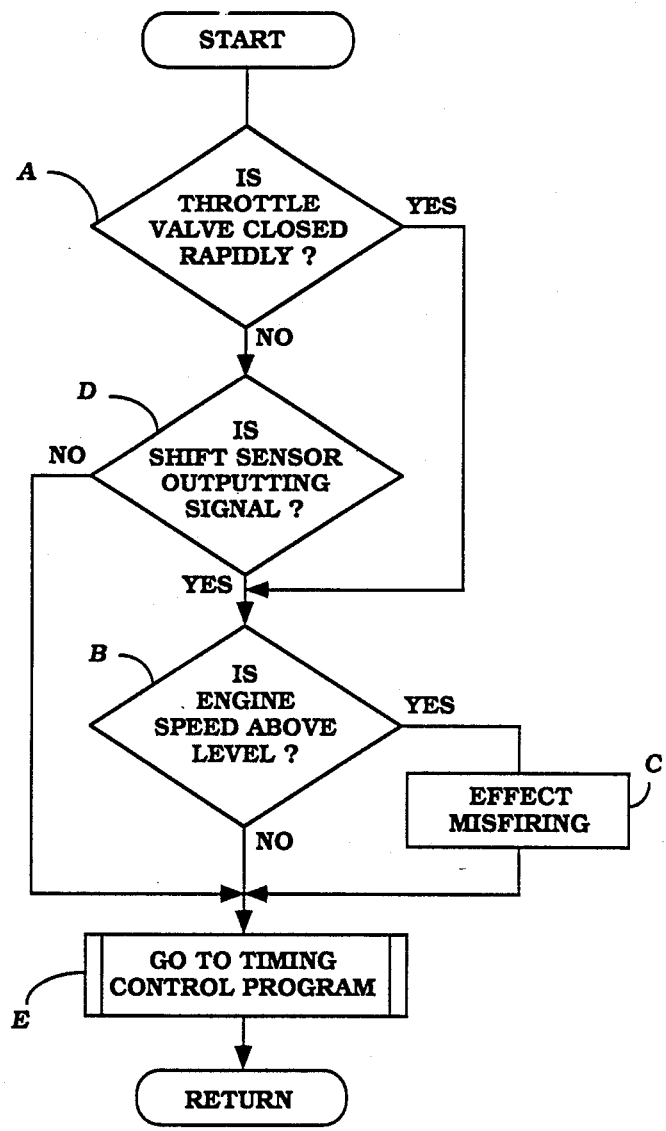
FIG. 9 is a block diagram showing a first routine for practicing the invention.

The first portion of a program for controlling the ignition timing is shown in FIG. 9. As seen this program, after starting has occured at the step A it is determined by the CPU 119 if the throttle detector 122 has outputted a signal indicating that the throttle valve is being closed rapidly. If it is indicated at the step A that the throttle valve is being closed rapidly, the program jumps to the step B to determine if the engine speed is above a predetermined relatively high engine speed such as 2000 rpms. If it is, slowing of the engine is effected by moving to the step C so as to effect misfiring by the control of the timing control 67, as aforenoted.

If it is determined at the step A that the throttle valve is not being closed rapidly, the program moves to the step D to determine if the shift sensor 45 is outputting a signal indicated that shift assist is required. If it is not, the program jumps to the step E so as to go to the timing control program. If, however, the shift sensor 45 indicates that a shift assist is required, the program moves to the step B to determine if the engine speed is above the aforenoted predetermined engine speed. If it is, then the program moves to the step C so as to effect misfiring so as to reduce the torque of the engine and assist in shifting.

Figure 10:
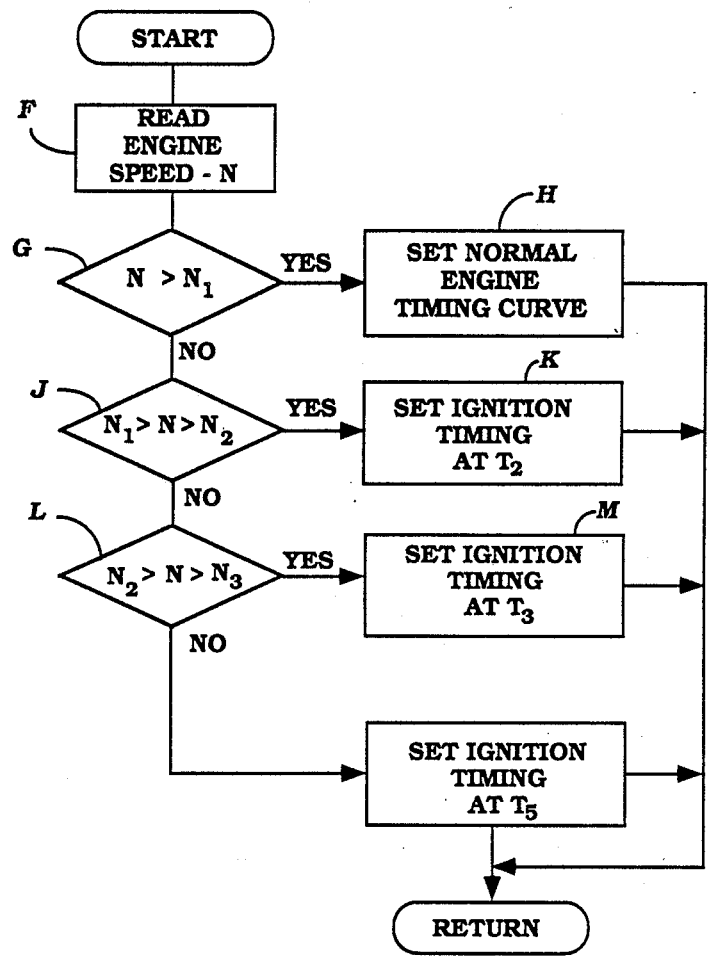
FIG. 10 is a block diagram showin a sub part of the routine for achieving spark advance and preventing uneven running and stalling.

At the completion of all of the aforenoted steps, the program moves to the timing control program at the step E. This timing control program is shown in FIG. 10 and reference will now be had to that figure.

Once the program has moved to the timing control program from step E of FIG. 9, the pgoram first reads at step F the actual speed of the engine as derived from the output from the engine speed and crank angle detector 116. A determination is then made at the step G as to whether the actual engine speed N exceeds the speed $N_1$. If it does, the program moves to the step H to set the normal engine timing curve.

If, however, the actual speed of the engine is less than the speed, N1 then a determination is made at the step J whether the actual engine speed N is greater than the speed $N_2$. If it is, the program then moves to to step K to set the ignition timing at the level $T_2$.

If, however, at the step J it is determined that the speed is less than the speed $N_2$ then the program moves to the step L to determine if the speed is greater than the speed $N_3$. If the speed is in this range, the program them moves to the step M so as to set the timing at the level $T_3$. If, however, the speed is less than the speed $N_3$, the timing is then set at the normal crank timing $T_s$.

Thus, it should be seen that the program is effected in selecting the appropriate spark advance curve of FIG. 6 depending upon measured speed and once it is determined that the timing control is appropriate.

Figure 11:
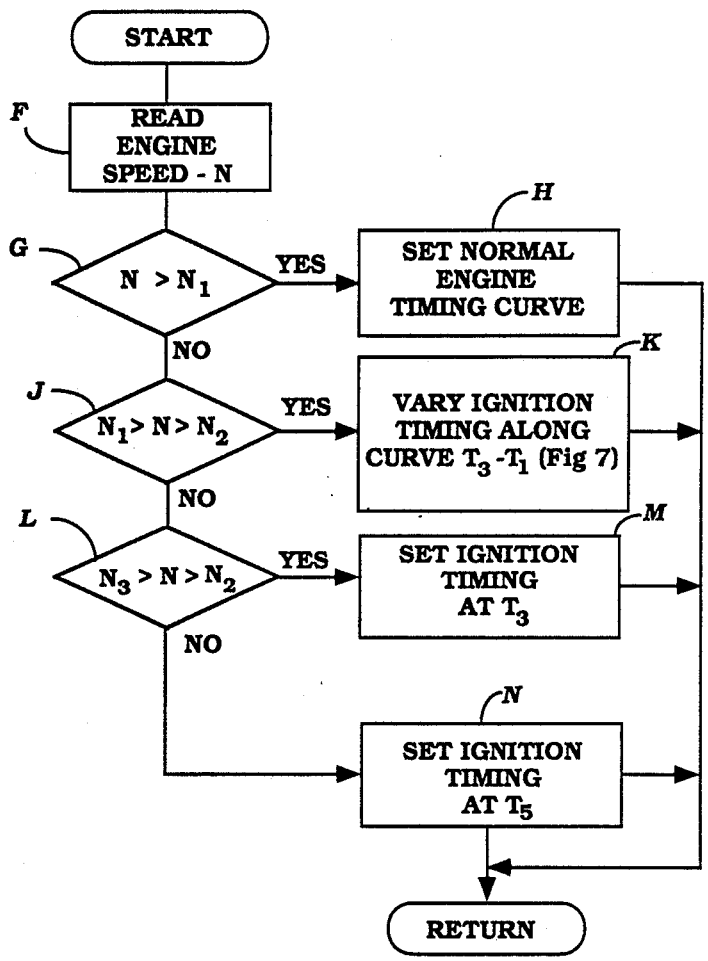
FIG. 11 is a block diagram showing another embodiment of routine for practicing the invention.

FIG. 11 shows a routine for establishing the timing along a curve of FIG. 7. The only difference between this routine and the routine shown in FIG. 10 is at the step K the timing is varied along the curve $T_3$ to $T_1$ depending upon the actual speed of the engine. In all other regards, this program is the same as the previously described program and further discussion of it is believed to be unnecessary.

It should be readily apparent from the foregoing description that the described embodiments of the invention are particularly useful in controlling the speed of an engine to reduce the speed to assist in shifting or alternatively to reduce the speed in response to some abnormal running condition. However, stalling of the engine under these speed reducing conditions is avoided by advancing the spark.

Although a number of embodiments of the invention have been illustrated and described, various changes and modifications may be made without departing from the spirit and scope of the invention, as defined by the appended claims.

We claim:

1. In a spark ignited internal combustion engine, means for firing the spark plug of said engine at a predetermined spark timing in accordance with a first established spark advance curve having a speed range including idle where the spark timing is fixed, and means for firing the spark plug at a point advanced from said fixed spark advance curve in response to the speed of said engine falling below a predetermined speed.

2. In a spark ignited internal combustion engine as set forth in claim 1 further including means for sensing an abnormal running of the engine and reducing the speed of the engine in response to the sensed abnormal running condition by interrupting the firing of the spark plug.

3. In a spark ignited internal combustion engine as set forth in claim 2 wherein the sensed abnormal condition is the shifting of an associated transmission.

4. In a spark ignited internal combustion engine as set forth in claim 2 wherein the sensed abnormal condition is rapid closing of the throttle valve of the engine.

5. In a spark ignited internal combustion engine as set forth in claim 1 wherein the predetermined speed of the engine comprises idle speed.

6. In a spark ignited internal combustion engine as set forth in claim 5 further including means for sensing an abnormal running of the engine and reducing the speed of the engine in response to the sensed abnormal running condition by interrupting the firing of the spark plug.

7. In a spark ignited internal combustion engine as set forth in claim 6 wherein the sensed abnormal condition is the shifting of an associated transmission.

8. In a spark ignited internal combustion engine as set forth in claim 6 wherein the sensed abnormal condition is rapid closing of the throttle valve of the engine.

9. In a spark ignited internal combustion engine as set forth in claim 1 wherein the spark is advanced to a predetermined point until the speed of the engine reaches a speed above a first speed and still below the predetermined speed and then the spark is retarded towards the fixed spark timing.

10. In a spark ignited internal combustion engine as set forth in claim 9 wherein the spark advance is reduced along a curve.

* * * * *